United States Patent

Cappo et al.

[11] Patent Number: 5,752,373
[45] Date of Patent: May 19, 1998

[54] NON-RIDING COMMERCIAL LAWN MOWER HAVING AN END SHAFT MOUNTED CLUTCH

[76] Inventors: Frederick L. Cappo, 2319 W. Uintah St., Colorado Springs, Colo. 80904; Ralph C. Young, 2119 Payton Cir., Colorado Springs, Colo. 80915

[21] Appl. No.: 745,262

[22] Filed: Nov. 8, 1996

[51] Int. Cl.⁶ .................................... A01D 34/82
[52] U.S. Cl. .................. 056/11.3; 56/11.8; 56/16.9; 56/DIG. 6; 180/19.3; 192/89.27; 192/89.21
[58] Field of Search ................... 56/11.3, 11.4, 56/11.5, 11.7, 11.8, 16.9, DIG. 4, DIG. 6; 180/19.1, 19.2, 19.3; 192/70.23, 89.27, 89.21

[56] References Cited

U.S. PATENT DOCUMENTS

| | | | |
|---|---|---|---|
| 1,740,265 | 12/1929 | Putney | 192/89.27 X |
| 4,117,652 | 10/1978 | Jones et al. | 56/11.8 |
| 4,650,058 | 3/1987 | Vaughan | 180/19.3 X |
| 4,841,794 | 6/1989 | Hikishima | 56/11.8 X |
| 5,651,241 | 7/1997 | Wagner | 56/11.4 X |

*Primary Examiner*—Terry Lee Melius
*Attorney, Agent, or Firm*—G. F. Gallinger

[57] ABSTRACT

An end shaft mounted clutch which is inexpensive to produce, maintain, and install, even on an existing belt driven lawn mower. On a non-riding lawn mower having two hand grips, a lateral drive shaft, and two independently driven drive wheels the improvement comprising: two end shaft mounted clutches, one mounted on each end of the drive shaft, each end shaft mounted clutch having a shaft sleeve having an exterior end portion having an elongated opening therethrough, and an interior end portion adapted to be rigidly affixed to the revolving shaft; a driver housing positioned on, and rigidly affixed to the interior end of the shaft sleeve; a driven sprocket/pulley and hub freely rotatable on the shaft sleeve unless biased towards the driven housing; bias means for biasing the driven sprocket/pulley towards the driver housing; and, on/off bias control means; two chains each extending between one of the driven sprocket/pulleys on the clutch and a drive wheel; and, clutch control means to independently control the clutches. The clutches which are independently chained to the drive wheels do not slip in wet grass, or plug up in long grass thereby losing forward drive.

20 Claims, 2 Drawing Sheets

NON-RIDING COMMERCIAL LAWN MOWER HAVING AN END SHAFT MOUNTED CLUTCH

FIELD OF INVENTION

This invention relates to mechanical clutches which may be mounted on a revolving shaft. More particularly this invention relates to such a clutch which may be mounted on the end of a revolving shaft and has particularly advantageous application in a commercial lawn mower.

BACKGROUND OF THE INVENTION

Commercial lawn mowers are generally belt driven. The left and right wheels are generally independently driven so that the lawn mower may be steered by disengaging one of the wheels while turning the other. One problem with a belt driven lawn mower is that the belts slip when cutting wet grass. Another problem is that the belts frequently become plugged with long grass. These problems may result in a loss of steering. It is also necessary to change the belts on a regular basis due to wear.

Most commercial lawn mowers are belt driven but because of the problems with the belts, hydraulically powered lawn mowers are also available. However, hydraulic lawn mowers are more than double the cost of belt driven lawn mowers; consequently, they are not popular due to cost. One additional advantage of a hydraulic lawn mower is that it is easier to control. With belts it is generally necessary to move an idler pulley 3–4 inches to disengage the drive. With the hydraulic system a gentle 1 inch movement of a control is quite sufficient for disengagement.

OBJECTS AND STATEMENT OF INVENTION

It is an object of this invention to disclose an end shaft mounted clutch which is inexpensive to produce, inexpensive to maintain, and inexpensive to mount and install. It is an object of this invention to disclose an end shaft mounted clutch which may be operated with minimal motion of a light weight control. It is a further object of this invention to disclose an end shaft mounted clutch which may be used to replace pulleys and belts which turn the drive wheels on an existing commercial lawn mower. (It is the drive wheels which are most prone to slippage when belts are used to power them because of their low speed and high torque requirements.) It is yet a further object of this invention to disclose a commercial lawn mower which has a cost comparable to a belt driven lawn mower, but which does not slip in wet grass, or plug up in long grass. It is yet a further object of this invention to disclose a lawn mower which may be mechanically steered and controlled with minimal effort.

One aspect of this invention provides for an end shaft mounted clutch for a revolving shaft comprising: a shaft sleeve having an exterior end portion and an interior end portion adapted to be rigidly affixed to the revolving shaft; a driver housing positioned on, and rigidly affixed to the interior end of the shaft sleeve; a driven sprocket/pulley and hub freely rotatable on the shaft sleeve unless biased towards the driven housing; bias means for biasing the driven sprocket/pulley towards the driver housing; and, an on/off bias control means.

Another aspect of this invention provides for a lawn mower having two hand grips, a lateral drive shaft, and two independently driven drive wheels having the improvement comprising: two end shaft mounted clutches as described above, one mounted on each end of the drive shaft; two power conveyance means each extending between one of the driven sprocket/pulleys on the clutch and a drive wheel; and, clutch control means to independently control the clutches.

Various other objects, advantages and features of novelty which characterize this invention are pointed out with particularity in the claims which form part of this disclosure. For a better understanding of the invention, its operating advantages, and the specific objects attained by its users, reference should be made to the accompanying drawings and description, in which preferred embodiments of the invention are illustrated.

FIGURES OF THE INVENTION

The invention will be better understood and objects other than those set forth will become apparent to those skilled in the art when consideration is given to the following detailed description thereof. Such description makes reference to the annexed drawings wherein:

FIG. 3 is an enlarged partial view of the cam rotation arm shown on the clutch in FIG. 1.

Figure 1:
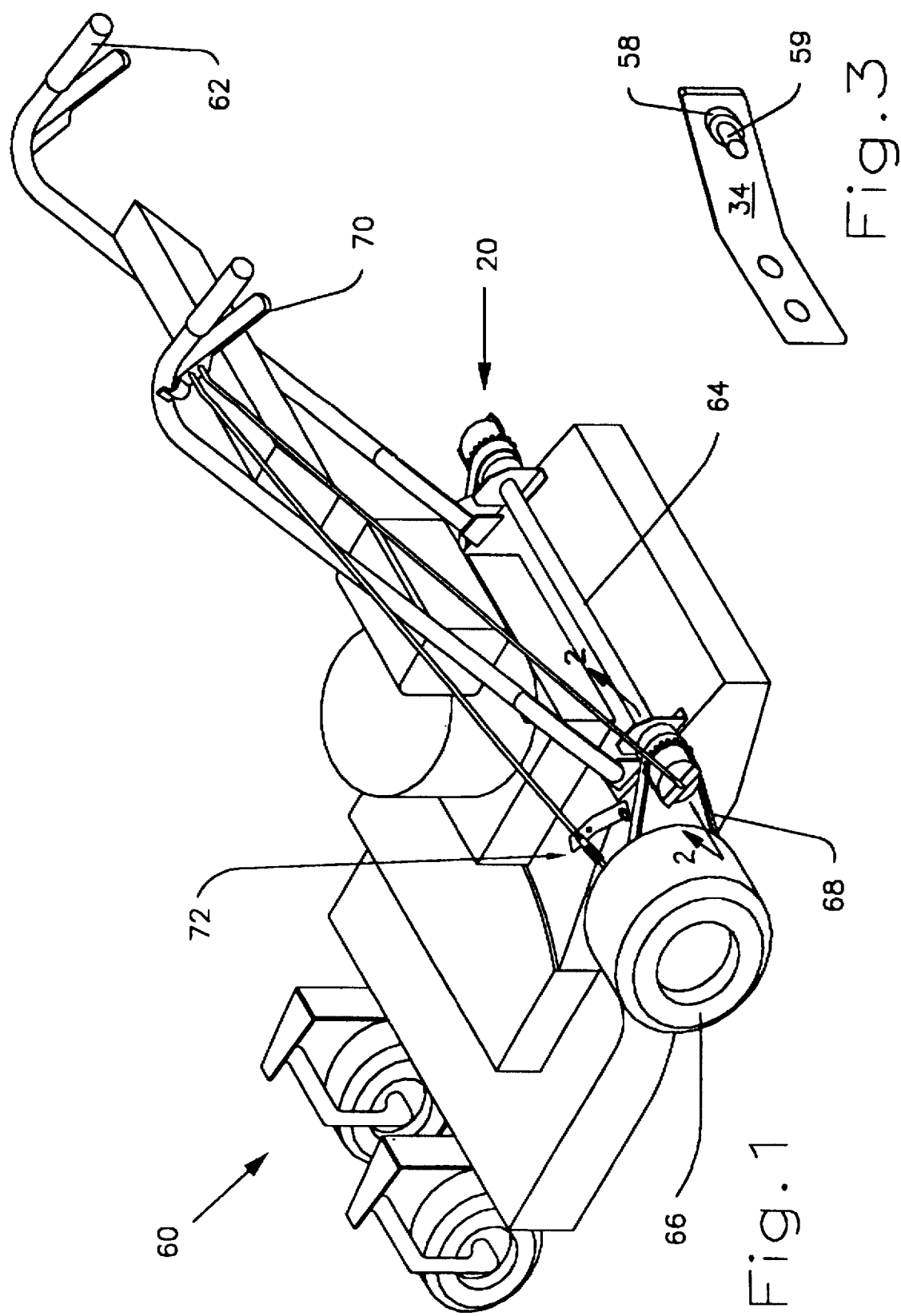
FIG. 1 is a perspective view of a non-riding commercial lawn mower.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of a non-riding commercial lawn mower 60. The lawn mower 60 has two hand grips 62, a lateral drive shaft 64, and two independently driven drive wheels 66, and two end shaft mounted clutches 20, one mounted on each end of the drive shaft 64. Two power conveyance means which most preferably are chains 68 extend from a clutch 20 to a drive wheel 66. Most preferably a clutch control means comprises a squeezable hand lever 70 positioned adjacent to each hand grip 62. The hand lever 70 engages the clutch 20 when in a fully open position, disengages the clutch when in an intermediate position, and applies a brake 72 when in a closed position, so that the lawn mower 60 may be steered by squeezing the hand levers 70.

Figure 2:
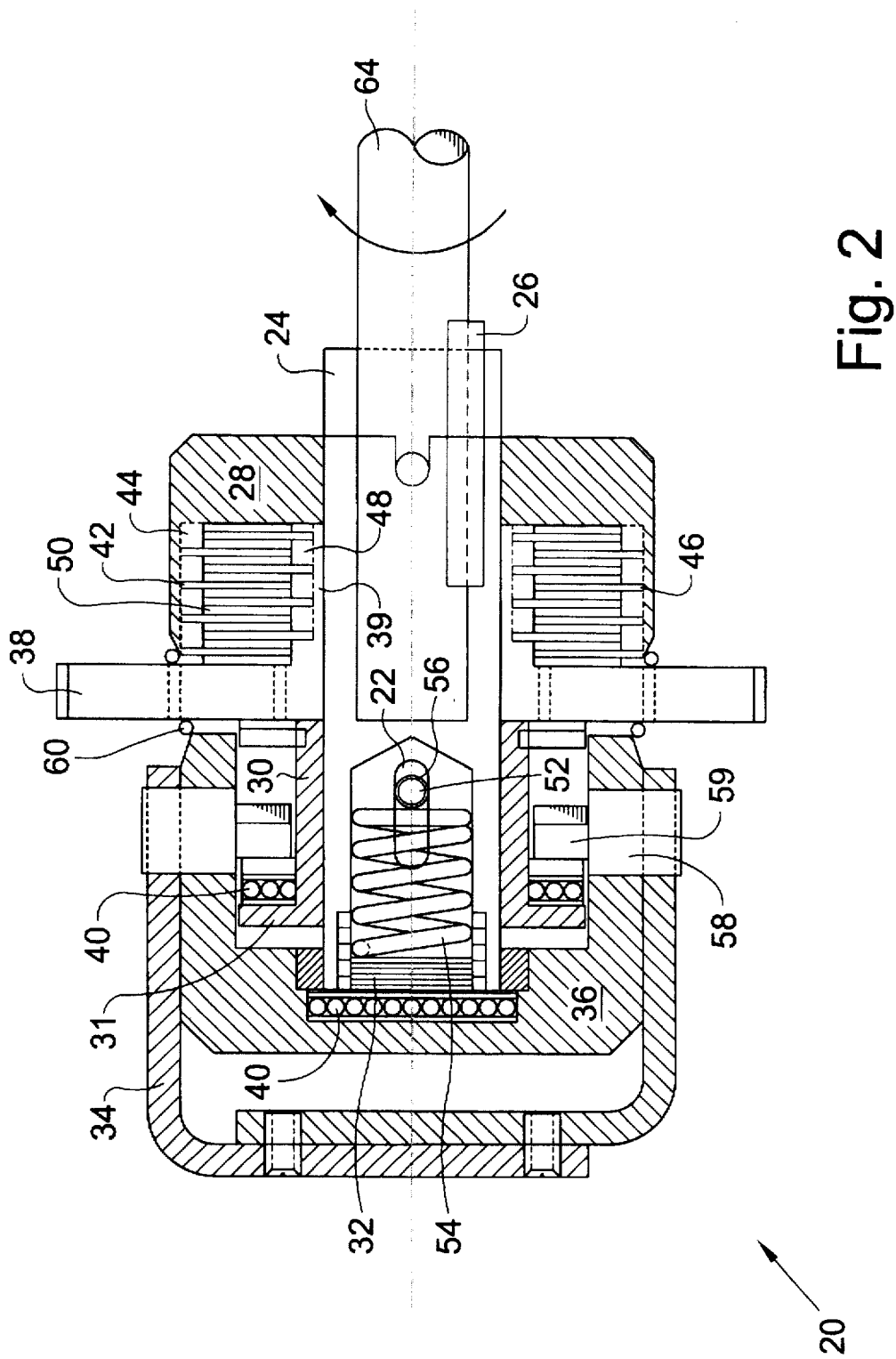
FIG. 2 is a cross sectional view of the clutch shown in FIG. 1 taken along line 2—2.

FIG. 2 is a cross sectional view of the clutch mounted on the end of the drive shaft 64, as shown in FIG. 1 as taken along line 2—2. The end shaft mounted clutch 20 for a revolving shaft 64 comprises: a shaft sleeve 24 having an exterior end portion, and an interior end portion adapted to be rigidly affixed (preferably with a key 26) to the revolving shaft 64; a driver housing 28 positioned on, and rigidly affixed to the interior end of the shaft sleeve 24; a driven sprocket/pulley 38 fixed to a hub 39 freely rotatable on the shaft sleeve 24 unless biased towards the driver housing 28; bias means (see following paragraph) for biasing the driven sprocket/pulley 38 towards the driver housing 28; and, on/off bias control means (see second following paragraph). Most preferably there are four keyed driver washers 42 keyed into a longitudinal groove 44 in the driver housing 28; four keyed driven washers 46 keyed into a longitudinal groove 48 in the hub 39 of the sprocket/pulley 38; and, friction plates 50 interposed between the driver housing 28, the driver washers 42, the driven washers 46, and the sprocket/pulley 38.

Most preferably the exterior end portion of the shaft sleeve 24 has an elongated opening 22 therethrough and the bias means comprises: a spring 54 positioned within the exterior end portion of the shaft sleeve 24; a pin 52 extending through the elongated hole 22 in the shaft sleeve 24, said pin 52 inwardly biased by the spring 54 on an interior portion thereof, and extending through the elongated opening 22 on an intermediate portion thereof; a lipped pressure maintenance ring 30 positioned on the exterior end portion of the shaft sleeve 24, having a radial hole 56 therethrough, and having an exterior portion of the pin 52 extending therethrough so that said ring 30 is biased inwardly and towards the sprocket/pulley 38, biasing it towards the driver housing 28. The clutch 20 is configured to normally maintain the driven sprocket/pulley 38 biased towards the driver housing 28 and thereby remain in an engaged position. The housings 28,36 are ramped inwardly adjacent to the sprocket/pulley 38 so that an O-ring 60 seated therearound will seal between the sprocket/pulley 38 and the housings 28,36.

FIG. 3 is an enlarged partial view of the cam rotation arm 34 shown on the clutch 20 in FIG. 1. Most preferably the bias control means comprises: a stationary housing 36; a cam shaft 58 extending through the stationary housing 36; a cam 59 on an interior end of the cam shaft 58, said cam 59 adjacent to the lip 31 on the pressure maintenance ring 30; and, the arm 34 connected to the exterior end of the cam shaft 58 so that when the arm 34 is lifted the cam 59 turns pressing against the lip 31 on the lipped pressure maintenance ring 30, releasing the bias by moving the pressure maintenance ring 30 away from the driver housing 28, and the driven sprocket/pulley 38 thereby disengaging the clutch 20.

In the most preferred embodiment the driver housing 28 is made of steel and stationery housing 36 is made of aluminum. The friction plate rings 44 are made of a substance similar to Formica™. The sprocket/pulley 38, which may be either a sprocket or a pulley, is most preferably a sprocket which has an elongated hub 39 adapted to accommodate the keyed driven washers 46. A bearing 40 is positioned between the end of the lipped pressure maintenance ring 30 and the cam 59. An additional bearing 40 is positioned between the exterior end portion of the shaft sleeve 24 and the stationary housing 36. Most preferably the spring 54 is held within the exterior end portion of the shaft sleeve 24 with a large screw 32.

While the invention has been described with preferred specific embodiments thereof, it will be understood that this description is intended to illustrate and not to limit the scope of the invention.

The optimal dimensional relationships for all parts of the invention are to include all variations in size, materials, shape, form, function, assembly, and operation, which are deemed readily apparent and obvious to one skilled in the art. All equivalent relationships to those illustrated in the drawings, and described in the specification, are intended to be encompassed in this invention. What is desired to be protected is defined by the following claims.

I claim:

1. An end shaft mounted clutch for a revolving shaft comprising:

a shaft sleeve having an exterior end portion and an interior end portion, said interior end portion positioned on and rigidly affixed to an end portion of the revolving shaft;

a driver housing positioned on, and rigidly affixed to the interior end portion of the shaft sleeve;

a driven sprocket/pulley and hub positioned on and freely rotatable on the shaft sleeve, unless biased towards the driver housing;

a bias means for biasing the driven sprocket/pulley towards the driver housing; and, on/off bias control means.

2. A clutch as in claim 1 further comprising:

a driver washer keyed into a longitudinal groove in the driver housing;

a driven washer keyed into a longitudinal groove in the hub of the sprocket/pulley; and, friction plate means interposed between the driver housing, the driven washer, the driver washer, and the sprocket/pulley.

3. A clutch as in claim 2 wherein the exterior end portion of the shaft sleeve has an elongated opening therethrough and the bias means comprises:

a spring positioned within the exterior end portion of the shaft sleeve;

a pin extending through the elongated hole in the shaft sleeve, said pin inwardly biased by the spring on an interior portion thereof, and extending through the elongated opening on an intermediate portion thereof;

a lipped pressure maintenance ring positioned on the exterior end portion of the sleeve, having a radial hole therethrough, and having an exterior portion of the pin extending therethrough so that said ring is biased inwardly and towards the sprocket/pulley, biasing it towards the driver housing.

4. A clutch as in claim 3 wherein said clutch is configured to normally maintain the driven sprocket/pulley biased towards the driver housing and thereby remain in an engaged position.

5. A clutch as in claim 3 wherein the control means comprises:

a stationary housing;

a cam shaft extending through the stationary housing;

a cam on an interior end of the cam shaft, said cam adjacent to the lip on the pressure maintenance ring; and, an arm connected to the exterior end of the cam shaft so that when the arm is lifted the cam turns pressing against the lip on the lipped pressure maintenance ring, releasing the bias by moving the pressure maintenance ring away from the driver housing, and the driven sprocket/pulley thereby disengaging the clutch.

6. A clutch as in claim 5 wherein the driver is made of steel and the stationery housing is made of aluminum.

7. A clutch as in claim 6 wherein the friction plate rings are made of a substance similar to Formica™.

8. A clutch as in claim 2 wherein there are 2 keyed driver washers and 2 keyed driven washers.

9. A clutch as in claim 2 where wherein there are 4 keyed driver washers and 4 keyed driven washers.

10. A clutch as in claim 1 wherein the sprocket/pulley comprises a sprocket having an elongated hub adapted to accommodate the keyed driven washers.

11. A clutch as in claim 5 further comprising bearings, one positioned between the end of the lipped pressure maintenance ring and the cam and the other positioned between the exterior end portion of the shaft sleeve and the stationary housing.

12. A clutch as in claim 3 wherein the spring is held within the exterior end portion of the shaft sleeve with a large screw.

13. A commercial lawn mower having two hand grips, a lateral drive shaft, and two independently driven drive wheels wherein the improvement comprises:

two end shaft mounted clutches one mounted on each end of the drive shaft, each end shaft mounted clutch having a shaft sleeve having an exterior end portion having an elongated opening therethrough, and an interior end portion, said interior end portion positioned on and rigidly affixed to an end portion of the revolving shaft; a driver housing positioned on, and rigidly affixed to the interior end portion of the shaft sleeve; a driven sprocket/pulley and hub positioned on and freely rotatable on the shaft sleeve, unless biased towards the driver housing;

bias means for biasing the driven sprocket/pulley towards the driver housing; and, on/off control means for controlling the bias;

two power conveyance means each extending between one of the driven sprocket/pulleys on the clutch and a drive wheel; and, clutch control means to independently control the clutches.

14. A mower as in claim 13 wherein the power conveyance means comprises a chain extending from the sprocket on each clutch to a drive wheel.

15. A mower as in claim 14 wherein the clutch further comprises a driver washer keyed into a longitudinal groove in the driver housing; a driven washer keyed into a longitudinal groove in the hub of the sprocket/pulley; and, friction plate means interposed between the driver housing, the driven washer, the driver washer, and the sprocket/pulley.

16. A mower as in claim 15 wherein the exterior end portion of the shaft sleeve of the clutch has on elongated opening therethrough and the bias means comprises:

a spring positioned within the exterior end portion of the sleeve;

a pin extending through an elongated hole in the shaft, said pin inwardly biased by the spring on an interior portion thereof, and extending through the elongated opening on an intermediate portion thereof; and, a lipped pressure maintenance ring positioned on the exterior end portion of the sleeve, having a radial hole therethrough, and having an exterior portion of the pin extending therethrough so that said ring is biased inwardly and towards the sprocket/pulley, biasing it towards the driver housing.

17. A mower as in claim 16 wherein the control means of the clutch further comprises:

a stationary housing;

a cam shaft extending through the stationary housing;

a cam on an interior end of the cam shaft, said cam adjacent to the lip on the pressure maintenance ring; and, an arm connected to the exterior end of the shaft so that when the arm is lifted the cam turns pressing against the lip on the lipped pressure maintenance ring, releasing the bias by moving the pressure maintenance ring away from the driver housing, and the driven sprocket/pulley thereby disengaging the clutch.

18. A mower as in claim 17 wherein the clutch control means comprises a squeezable hand lever positioned adjacent to each hand grip.

19. A lawn mower as in claim 18 wherein the hand lever disengages the clutch and applies the brake when in a fully closed position, and engages the clutch when in an open position, so that the lawn mower may be steered by squeezing the hand levers.

20. A lawn mower as in claim 5 wherein a housing is ramped inwardly adjacent to the sprocket/pulley so that an O-ring seated therearound will seal between said sprocket/pulley and the housing.

* * * * *